United States Patent
Simpson et al.

(10) Patent No.: US 7,305,449 B2
(45) Date of Patent: Dec. 4, 2007

(54) WEB-BASED IMAGING SERVICE PROVIDING RESERVATION

(75) Inventors: Shell S. Simpson, Boise, ID (US);
Ward S. Foster, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 740 days.

(21) Appl. No.: 10/001,721

(22) Filed: Oct. 30, 2001

(65) Prior Publication Data

US 2003/0084151 A1    May 1, 2003

(51) Int. Cl.
*G06F 15/16* (2006.01)

(52) U.S. Cl. ............... 709/207; 709/203; 709/218; 709/201; 358/1.15

(58) Field of Classification Search ......... 709/225, 709/229, 203, 201, 207, 218; 358/1.14, 1.15, 358/1.5; 345/740; 399/87; 718/102
See application file for complete search history.

(56) References Cited

U.S. PATENT DOCUMENTS

| | | | |
|---|---|---|---|
| 6,044,367 A | 3/2000 | Wolff | 707/2 |
| 6,067,545 A | 5/2000 | Wolff | 707/10 |
| 6,125,249 A * | 9/2000 | Ootsuka et al. | 399/87 |
| 6,130,757 A | 10/2000 | Yoshida et al. | 358/1.15 |
| 6,185,601 B1 | 2/2001 | Wolff | 709/203 |
| 6,310,692 B1 * | 10/2001 | Fan et al. | 358/1.14 |
| 6,327,045 B1 * | 12/2001 | Teng et al. | 358/1.15 |
| 6,332,170 B1 * | 12/2001 | Ban | 710/6 |
| 6,573,910 B1 * | 6/2003 | Duke et al. | 715/740 |
| 6,618,167 B1 * | 9/2003 | Shah | 358/1.15 |
| 6,757,070 B1 * | 6/2004 | Lin et al. | 358/1.1 |
| 2001/0052995 A1 * | 12/2001 | Idehara | 358/1.15 |
| 2003/0011811 A1 * | 1/2003 | Clough | 358/1.15 |
| 2003/0208607 A1 * | 11/2003 | Yamazaki | 709/229 |

OTHER PUBLICATIONS

U.S. Appl. No. 09/712,336, filed Nov. 13, 2000, Shell S. Simpson.
U.S. Appl. No. 09/874,184, filed Jun. 4, 2001, Shell S. Simpson.
U.S. Appl. No. 09/874,427, filed Jun. 4, 2001, Shell S. Simpson.
U.S. Appl. No. 09/924,058, filed Aug. 8, 2001, Shell S. Simpson.
Hewlett-Packard Company, "Printing & Digital Imagingm hp LaserJet 8150 Series," http://www.pandi.hp.com/pandi-db/prodinfo.main?product=laserjet8150&Region=1, Jun. 13, 2001.

(Continued)

*Primary Examiner*—William Vaughn
*Assistant Examiner*—Djenane M. Bayard

(57) ABSTRACT

In a web-based imaging environment, a user accesses a destination service representing a production device, which retrieves user's imaging data and configures available processing job options. The user selects production options, after which the destination service estimates the time required to process user's job. The user is provided an option of reserving a deferred start time for the processing job. If the user opts to reserve, then a deferred start time is selected, avoiding periods when the production device is unavailable, for example when previously reserved, and user's job is stored until the deferred start time. Advantageously, resources for the job are estimated, reserved, and monitored, displaying until deferred start time. Other jobs cannot consume these resources, which are reported with a warning message as if already consumed, whenever a reserved resource is depleted to a quantity insufficient for the deferred processing.

21 Claims, 7 Drawing Sheets

OTHER PUBLICATIONS

Hewlett-Packard Company, "Printing & Digital Imagingm hp LaserJet 8550 Series," http://www.pandi.hp.com/pandi-db/prodinfo.main?product=laserjet8550&Region=1, Jun. 13, 2001.

Xerox USA, "Specifications for Document Centr 480ST," http://www.xerox.com/go/xix/template/002.jsp?prodID=DC480ST&Xentry=USA&Xlang=n_US& Xseg=cor, Jun. 13, 2001.

* cited by examiner

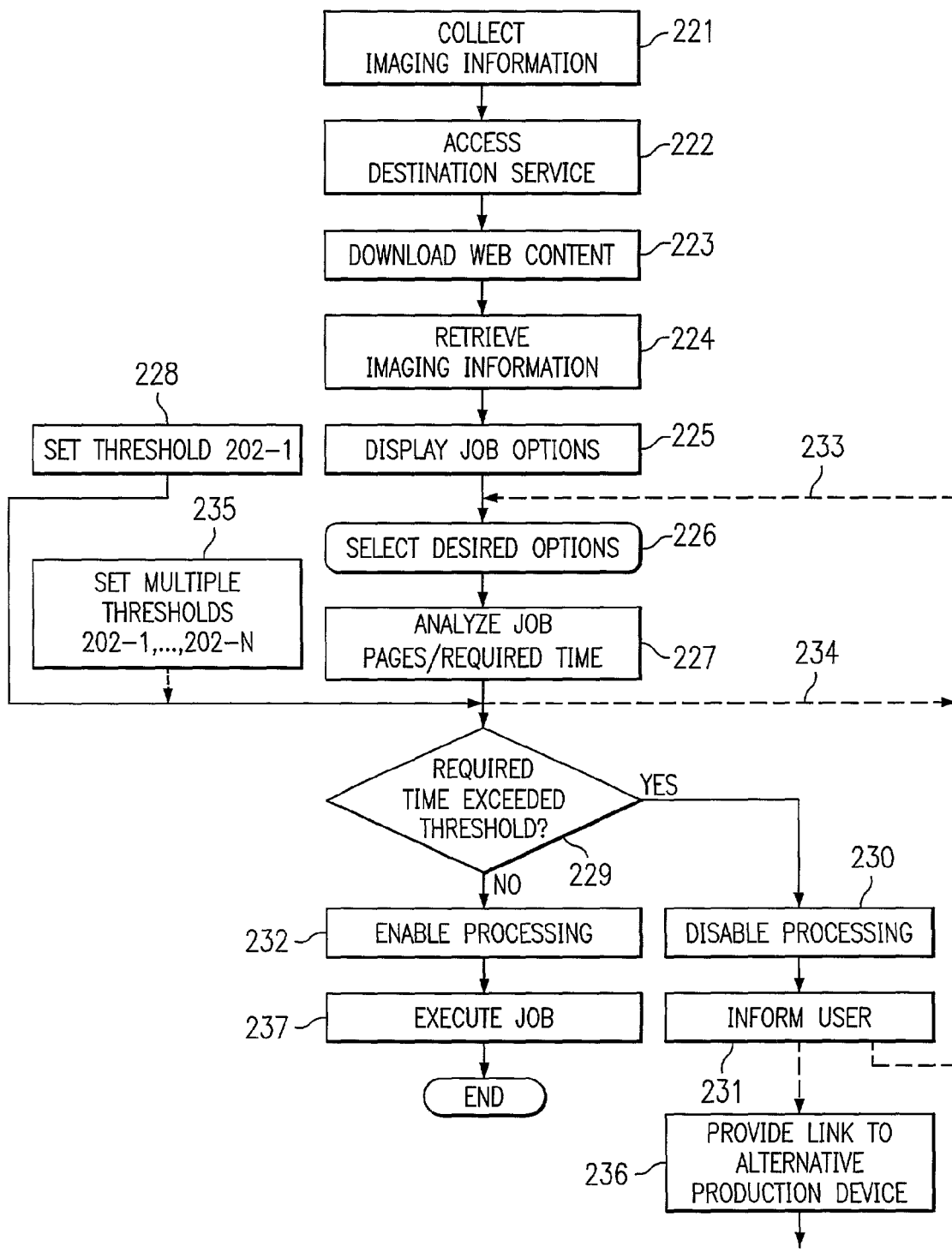

WEB-BASED IMAGING SERVICE PROVIDING RESERVATION

RELATED APPLICATIONS

The present application is related to co-pending and commonly assigned U.S. patent application Ser. No. 09/712,336 entitled "SYSTEM AND METHOD FOR PROCESSING DATA IN A DISTRIBUTED ENVIRONMENT," filed Nov. 13, 2000; co-pending and commonly assigned U.S. patent application Ser. No. 09/874,184 entitled "SYSTEM AND METHOD FOR PRINTING FROM A WEB APPLICATION," filed Jun. 4, 2001; co-pending and commonly assigned U.S. patent application Ser. No. 09/874,427 entitled "DYNAMIC PRODUCTION DEVICE REPRESENTATION IN A DISTRIBUTED ENVIRONMENT," filed Jun. 4, 2001; co-pending and commonly assigned U.S. patent application Ser. No. 09/924,058 entitled "SYSTEM AND METHOD AND PROGRAM PRODUCT FOR MULTIUSER PROFILE OPERATIONS AND GROUP COMPOSITION STORE" filed Aug. 8, 2001, the disclosures of which are all hereby incorporated herein by reference.

TECHNICAL FIELD

The invention relates to a system and method for processing of imaging data in a distributed computing environment, and more particularly to a system and method of relieving competition between processing jobs sharing a production device.

BACKGROUND

In the workplace environment there is increasing usage demand on printers and other web based production devices. This occurs in part because emergent in-house publishing, typified by a few large jobs each requiring large numbers of copies, and traditional office printing and copying, conversely typified by many short jobs randomly distributed during the workday, often compete for the same time and resources of a shared production device. If not controlled during the workday, a few large jobs can dominate a printer or other shared processing equipment, to the exclusion of multiple short jobs and to the loss of productivity of users who must wait for equipment availability. Alternatively, some large job users are reluctant to process their job during the normal workday, because it would dominate the production device. Particularly, this situation is aggravated by the recent proliferation of printers having optional or extended scanning, copying, and facsimile capabilities. Thus not only short vs. long run job users, but also multifunctional users can compete for a single production device. It is desirable in the art to develop a system and method for relieving competition of large and small processing jobs for a shared production device, without allowing large processing jobs to dominate the shared production device.

SUMMARY OF THE INVENTION

The present invention is directed to an approach for relieving competition in a web based imaging environment of large and small processing jobs for a shared production device, without allowing large processing jobs to dominate the shared production device. A user accesses a destination service representing a production device, which retrieves user's imaging data and configures available processing job options. The user selects production options, after which the destination service estimates the time required to process user's job. The user is provided an option of reserving a deferred start time for the processing job. If the user opts to reserve, then a deferred start time is selected, avoiding periods when the production device is unavailable, for example when previously reserved, and user's job is stored until the deferred start time. Advantageously, resources for the job are estimated, reserved, and monitored until deferred start time. Other jobs cannot consume these resources, which are reported with a warning message as if already consumed, whenever a reserved resource is depleted to a quantity insufficient for the deferred processing.

BRIEF DESCRIPTION OF THE DRAWING

FIG. 2B is a flow diagram depicting operation of an embodiment of the configurable web-based imaging service illustrated in FIG. 2A;

GLOSSARY OF TERMS AND ACRONYMS

Figure 1A:
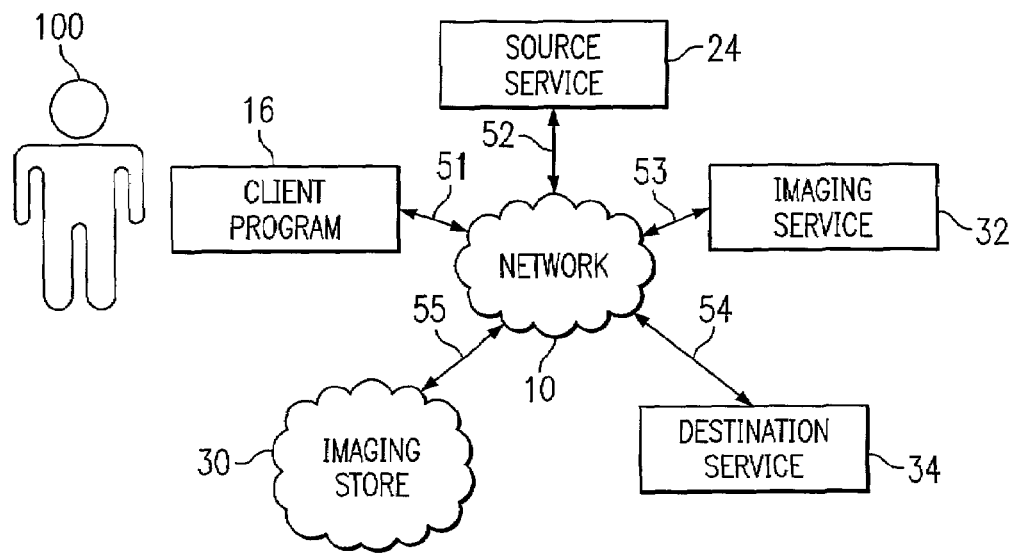
FIG. 1A is a simplified schematic diagram representing a logical overview of a typical web-based imaging system, in accordance with embodiments of the present invention.

The following terms and acronyms are used throughout the Detailed Description:

"API". An application programming interface (API) is a library of programmatic methods provided by a system of some kind (an example is a web-based imaging system, as in the present invention) that enables client programs (web application content operating within the browser is one example) to interact with that system. One method of creating an API is to create a library. For example, in JAVA™, a library (conventionally called ajar file) is created by defining a class or classes, compiling the class or classes, and grouping the class or classes into a library. For example, the following class could be created:

class BaseConversionAPI {static public String convertBaseToBase (String in Number, int inBase, int outBase) {// Code for returning a string representing innumber converted to outBase}}

That class would then be compiled with the command:

java.exe BaseConversionAPI java

NOTE: Programs are typically stored in text files, which are "compiled" in order to create "object files" which contain the executable (or interpretable) instructions. In this case, the program is contained in the file BaseConversion-APIjava. The act of compiling creates a file named "BaseConversionAPI.class" containing instructions for a specific computing architecture (in this case the JAVA™ Virtual Machine) corresponding to the program.

Next in this example, a Jar file would be created:

jar.exe cvf BaseConversionAPI.tar BaseConversionAPI.class

This command creates a "library" file containing the BaseConversionAPI class. This last step is not absolutely required. In some instances, API's are provided as simply files containing executable instructions (such as the BaseConversionAPI.class file).

References regarding the creation of API's:

http://www.library.yale.edu/orbis2/public/activity/AP.html

Note that the API's to network services (graphic store, composition store, and user profile store, all to be discussed below) would be created to be accessible through a remote invocation technology such as CORBA, JAVA™-RMI, DCOM™, RPC, or SOAP. A wide variety of references are available that describe how API's can be created to be accessible through a remote invocation technology, such as one of the technologies noted above.

"Client-Server". A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on the computer of a user; the program which responds to browser requests by serving Web pages, or other types of Web content, is commonly referred to as a "Web server."

"Composition." Composition, also referred to as a "graphics composition," comprises a file with links to graphic data serviced as a single unit, i.e., a graphic. The file also usually includes information on the placement of those graphics on a sequence of canvases. It describes how to combine one or more graphics from one or more sources onto a sequence of canvasses, in a variety of different ways. The use of compositions allows multiple compositions to reference a graphic in a graphic store without having to duplicate the graphic.

"Composition store". Composition store refers to a service (ideally implemented as a network service) that stores and provides access to imaging composition(s) that can be accessed by the user or web services. In this context, providing "access" includes providing methods for building compositions, modifying compositions, and accessing them piecemeal. For example, a set of methods available for execution via the composition store might include the methods Get a Composition, Create a Composition, Delete a Composition, and Modify a Composition.

"Content." A set of executable instructions that is served by a server to a client and that is intended to be executed by the client so as to provide the client with certain functionality. Web content refers to content that is meant to be executed by operation of a Web browser. Web content, therefore, may non-exhaustively include one or more of the following: HTML code, SGML code, XML code, XSL code, CSS code, JAVA™ applet, JavaScript™ and C-"Sharp" code.

"Exchange infrastructure." An exchange infrastructure is a collection of services distributed throughout a network that store imaging data associated with a particular user through a user profile.

"Firewall." A firewall filters out unwanted communication packets in one or more directions. By way of example, in one implementation of a firewall, requests from inside a firewall may be made to access data on the outside of the firewall, and responses to such requests are typically permitted. Communications initiated from outside the firewall to devices inside of the firewall are typically not permitted. Generally, the firewall may be implemented by a firewall proxy server that allows devices inside the firewall to pass HTTP requests to web servers outside the firewall. Obviously, other protocols may be used to implement communication through the firewall.

"Generic access instructions." A generic access instruction refers to an executable instruction that is intended to cause the executing device to generate generic access requests in order to access a set of target graphic data. These instructions call methods provided by, for example, an imaging extension, but are executing within a JVM/JAVA™ or similar environment (which the imaging extension is part of). Methods provided by the environment in which the program is executed are typically called an "Application Programming Interface" (API). Note that a generic access instruction does not include the location of the target graphic data. Typically, the target graphic data is pre-selected (generally by a user) and its location is determined from information that is maintained locally within the executing device.

For purposes of this application, the term "generic access instruction" refers to an executable instruction that is intended to cause the executing device to generate generic access requests in order to access a set of target data. A generic access instruction, however, does not include the location of the target data itself and neither does the generic access requests. Importantly, the target data is pre-selected (typically by a user) and its location is determined from information that is maintained locally within the executing computer or otherwise associated with the user. For this reason, the target data for a particular computer is said to be "associated" with that computer or more specifically with that user. Thus, for example, the target data that is associated with computer "A" is the data that computer "A" will access in response to a generic access instruction. The target data that is associated with computer "B" is the data that computer "B" will access in response to the identical generic access instruction.

Furthermore, in the case wherein the target data represents an image, that image is referred to herein as the "target image." In this simplified example, it will be assumed that all generic access instructions specified by the system wide standard mentioned above are for accessing data that describes an image.

"Graphic data." Graphic data refers to digital data capable of being represented as two dimensional graphics, such as a Portable Document Format ("PDF") file or a Joint Photographic Experts Group ("JPEG") file.

"Graphic store." Graphic store refers to a network service or a storage device for storing graphics data that can be accessed by the user or other network services. The graphic store preferably accepts the graphic data in multiple standard file formats, and the graphic data is converted into these file formats when necessary depending on the implementation.

"Hyperlink." A navigational link from one document to another, from one portion (or component) of a document to another, or to a Web resource, such as a JAVA™ applet. Typically, a hyperlink is displayed as a highlighted word or phrase that can be selected by clicking on it using a mouse to jump to the associated document or document portion or to retrieve a particular resource.

"Hypertext System." A computer-based informational system in which documents (and possibly other types of data entities) are linked together via hyperlinks to form a user-navigable "web."

"HTML" (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see for example Ian S. Graham, The HTML Source Book, John Wiley and Sons, Inc., 1995 (ISBN 0471-11894-4).

"HTTP" (HyperText Transport Protocol). The standard World Wide Web clientserver protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

"Imaging composition." An imaging composition comprises links to imaging data serviced as a single unit.

"Imaging data." Imaging data refers to digital data capable of being represented as two dimensional graphics, such as a Portable Document Format ("PDF") file or a Joint Photographic Experts Group ("JPEG") file.

"Imaging data store." Imaging data store refers to a network service or a storage device for storing imaging data that can be accessed by the user or other network services. The imaging data store preferably accepts the imaging data in multiple standard file formats, and the imaging data is converted into these file formats when necessary depending on the implementation.

"Internet." A collection of interconnected or disconnected networks (public and/or private) that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

"PDA" (Personal Digital Assistant). A small hand-held computer used, for example, to write notes, track appointments, send email and browse the web with generally with far less storage capacity than a desktop computer.

"Personal imaging repository." A personal imaging repository is a conceptual term describing the exchange infrastructure used to exchange graphics composition and graphics data with web services. Users are associated with their graphics data through user profiles. It should be noted that the personal imaging repository 50 can represent any type or combination of data storage devices.

"URL" niform Resource Locator). A unique address which fully specifies the location of a file or other resource on the Internet or a network. The general format of a URL is protocol: //machine address: port/path/filename.

"User Information." User information is identification and security information used in accessing graphics composition(s) and graphics data associated with a particular user profile. It is preferably accessed either directly or indirectly through methods provided by an extension component integrated into the web browser.

"User Interface." The junction between a user and a computer program providing commands or menus through which a user communicates with a program. For example, in the client-server model defined above, the server usually generates and delivers to a client a user interface for communicating with a program operating on or controlled by the server device. Where the server is a web server, the user interface is a web page. The web page when displayed by the client device presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

"World Wide Web" ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass WAP and WML for mobile phone web browsers, as well as other current and future markup languages and transport protocols which may be used in place of (or in addition to) HTML and HTTP.

"Web Site." A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, for example, a Web site may have the ability to print documents, scan documents, etc.

"Web service." A web service is intended to refer to a service that is provided (at least in part) by a web server. But a web service is a broader concept than a web server. In this regard, a "Web server" is a program that, using the client/server model and the World Wide Web's Hypertext Transfer Protocol (Hypertext Transfer Protocol), serves the files that form Web pages to Web users (whose computers contain HTTP clients that forward their requests). Every computer on the Internet that contains a Web site must have a Web server program. The most popular Web servers currently are Microsoft's Internet Information Server (Internet Information Server), which comes with the Windows NT server; Netscape FastTrack™ and Enterprise™ servers; and Apache, a Web server for UNIX-based operating systems. Other Web servers include Novell's Web Server for users of its NetWare™ operating system and IBM's family of Lotus Domino servers, primarily for IBM's OS/390™ and AS/400™ customers.

Web servers often come as part of a larger package of Internet- and intranet-related programs for serving e-mail, downloading requests for File Transfer Protocol files, and building and publishing Web pages. This larger package is referred to as the web service. Parameters for a Web server include how well it works with various operating systems and other servers, its ability to handle server-side programming, and publishing, search engines, and site building tools in the package.

DETAILED DESCRIPTION

FIG. 1A is a simplified schematic diagram representing a logical overview of a typical web-based imaging system, in accordance with embodiments of the present invention. User 100 interfaces with client program 16, typically a web browser, which is logically connected through data path 51 with network 10. Also logically connected with network 10 through respective data paths 52-55 are for example among other entities source service 24, an imaging service 32, destination service 34, and imaging store 30 (for further description of a source service, a destination service, and an imaging store see co-pending and commonly assigned U.S. patent applications Ser. Nos. 09/712,336, 09/874,184, 09/874,427, and 09/924,058, cited above, the disclosures of which have been incorporated herein by reference). Network 10 can be any of a variety of network types, including for example Internet, Intranet, and Ethernet, and the transmission medium of network 10 and data paths 51-55 can include electrically conductive cable, optical fiber, semiconductor, wireless, or any combinations of these. Data paths 51-55 need not be physical links but can represent data flows through any media. In general a web-based imaging system can include multiple client programs 16, source services 24, destination services 34, and imaging stores 30 each interconnected with a network 10 and having a unique network address, typically represented by a Uniform Resource Locator (URL). Imaging service 32 is a logical entity providing client program 16 access to multiple destination services 34 by accessing and downloading interfaces, typically web pages conventionally generated using HyperText Markup Language (HTML) coding. Web documents are conventionally located and acquired throughout network 10 using HyperText Transfer Protocol (HTTP).

Figure 1B:
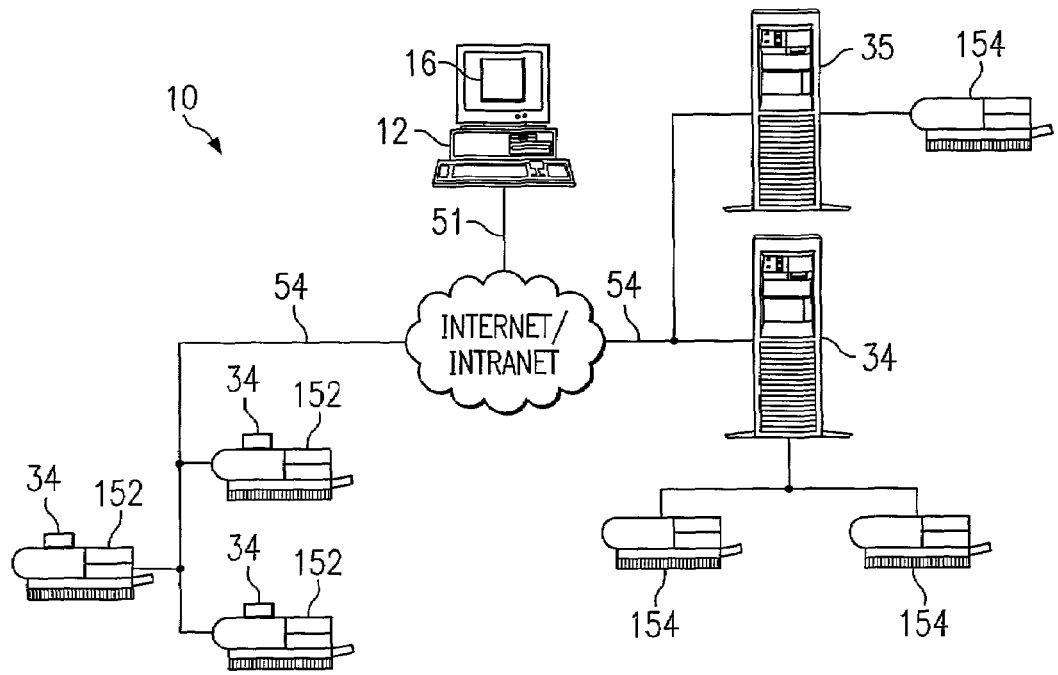
FIG. 1B is a simplified schematic diagram depicting various aspects of destination services, in accordance with embodiments of the present invention.

FIG. 1B is a simplified schematic diagram depicting various aspects of destination services 34, in accordance with embodiments of the present invention. A destination service 34 typically is a destination web service that represents one or more production devices 152, 154 on network 10. Production devices 152, 154 include printers; paper handling accessories such as binders, sorters, or folders; e-mail clients; facsimile devices; web servers; and data storage devices. Production devices are not, however, limited to those above, but may include any devices capable of electronically or physically saving, displaying, formatting, or transferring a target image. Some production devices perform a single type of service, for example printing, whereas other production devices perform multiple services.

A self-representing production device 152 contains an embedded destination service 34, which represents production device 152 on network 10, allowing production device 152 to be connected directly to network 10 and accessed directly by client program 16. Client program 16 is typically a web browser that runs in a client machine 12, commonly a desktop or laptop and potentially a handheld computer or personal digital assistant (PDA). On the other hand, a production device 154 such as a conventional printer is incapable of self-representation and consequently must be connected to and controlled by an external destination service 34 running on an intermediate device such as a desktop computer or a print server machine.

In some embodiments of the present invention, source service 24 generates a set of data representing a printable version of a target image, which includes a controlled symbol referring to a predetermined symbol set. Only when the printable version of the target image is accessed by an appropriate destination service that contains the predetermined symbol set, for example appropriate destination service 35, can the controlled symbol in the target image be produced or displayed. Any other destination service 34 not containing the predetermined symbol set, including for example destination services accessible through imaging service 32, can print or display at most only a proxy symbol in place of the controlled symbol, when printing or displaying the image. The data representing the printable version of the target image are referenced by a composition stored in imaging store 30, as described in more detail below.

Figure 1C:
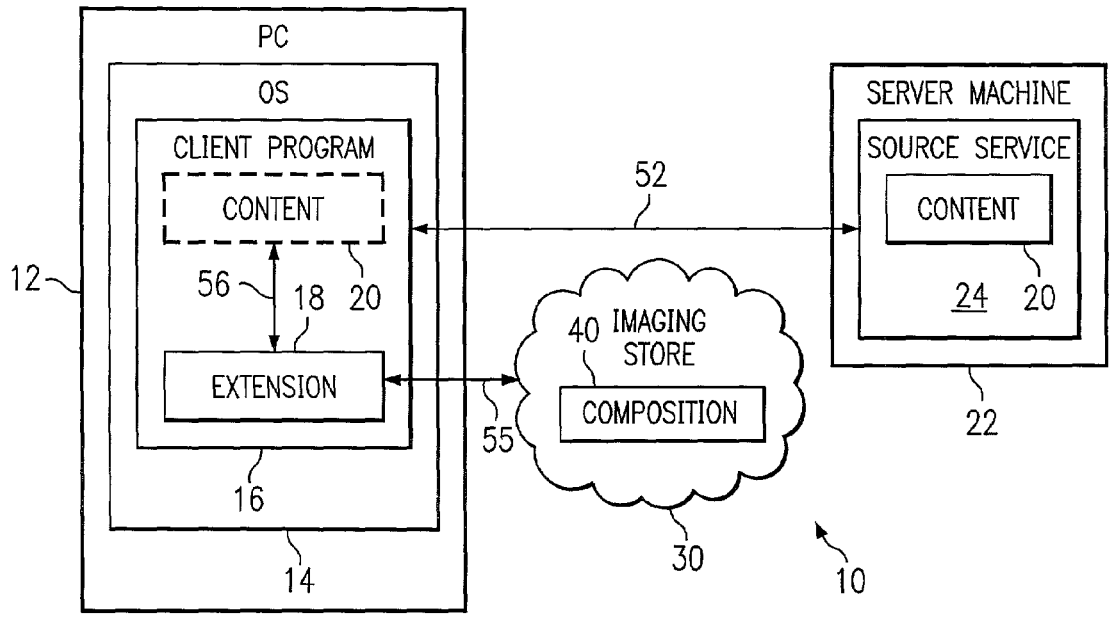
FIG. 1C is a schematic diagram illustrating in more detail various aspects of the network of FIG. 1A, in accordance with embodiments of the present invention.

FIG. 1C is a schematic diagram illustrating in more detail various aspects of network 10 of FIG. 1A, in accordance with embodiments of the present invention. Client program 16 running on operating system 14 in client machine 12 is logically interconnected through data path 52 of network 10 with source service 24, typically a source web service that runs on server machine 22 and generates interfaces, typically web content 20. When client program 16 browses to source service 24, web content 20, usually including executable content, is downloaded into the browser window of client program 16. Executable content 20 accesses imaging store 30 via application programming interfaces (APIs) contained in a modified imaging extension 18 of client program 16, for example through data paths 55 and 56. For further description of imaging extensions containing APIs see co-pending and commonly assigned U.S. patent applications Ser. Nos. 09/874,184 and 09/924,058, cited above, the disclosures of which have been incorporated herein by reference. Modified imaging extension 18, described in more detail below, can be accessed by, for example, JAVA™ applets for accessing imaging store 30, although other web programming technologies can be used.

In some embodiments of the present invention, a preview version of the printable version of the target image is incorporated into web content 20 of accessed destination services 34, 35, including destination services 34, 35 accessed through imaging service 32 which provides links to source and destination services, and is previewed to user 100 through client program 16 in the context of the capabilities of accessed destination services 34, 35. When user 100 selects the "print now" option, the entire production process is controlled indirectly by user 100 through client program 16.

In the workplace environment there is increasing usage demand on printers and other web based production devices. This occurs in part because emergent in-house publishing, typified by a few large jobs each requiring large numbers of copies, and traditional office printing and copying, conversely typified by many small jobs randomly distributed through the workday, often compete for the same time and resources of a shared production device. If not controlled during the workday, a few large jobs can dominate a printer or other shared processing equipment, to the exclusion of multiple short jobs and to the loss of productivity of users who must wait for equipment availability.

Particularly, this situation is aggravated by the recent proliferation of printers having optional or extended scanning, copying, and facsimile capabilities, including for example LaserJet™ models 8150mfp™ and 8550mfp™ manufactured by the Hewlett Packard Company and the Document Center™ 480ST™ manufactured by the Xerox Corporation. Thus not only small vs. large job users, but also multifunctional users can compete for a single production device.

Figure 2A:
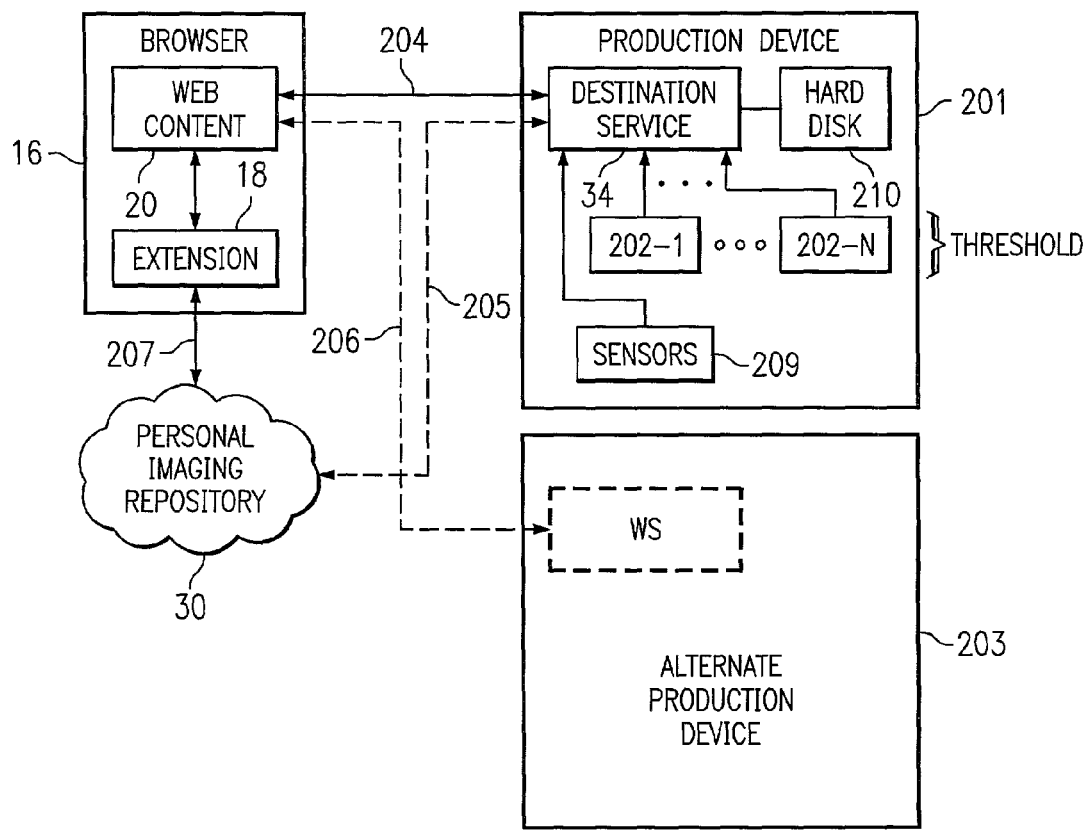
FIG. 2A is a simplified block diagram illustrating a configurable web-based imaging service that relieves competition between processing jobs sharing a production device, in accordance with embodiments of the present invention.

FIG. 2A is a simplified block diagram illustrating a configurable web-based imaging service that relieves competition between processing jobs sharing a production device, in accordance with embodiments of the present invention. FIG. 2B is a flow diagram depicting the operation of an embodiment of the configurable web-based imaging service illustrated in FIG. 2A. At block 221 of FIG. 2B a user collects imaging information into personal imaging repository 30 illustrated in FIG. 2A, and at block 222 accesses destination service 34 representing production device 201, which at block 223 downloads web content 20 over data link 204 into user's browser 16. At block 224 web content 20 retrieves imaging information from user's personal imaging repository 30 via imaging extension 18 and data link 207, and at block 225 displays production job options in the window of browser 16. Alternatively, at block 224 destination service 34 retrieves imaging information by directly accessing user's personal imaging repository over data link 205.

After the user selects desired production options as illustrated at block 226, destination service 34 at block 227 performs an analysis of how much time and resources are required to process the job using the selected production job options and taking into account the imaging information retrieved from user's personal imaging repository 30. If the amount of time required is determined at block 229 to be greater than a threshold 202-1 previously set at block 228, the option of processing is disabled as illustrated at block 230, and the user is informed at block 231 through an appropriate message in the window of browser 16, for example "Your job is too large." If the amount of time required is determined at block 229 not to be greater than threshold 202-1, then the option to process is enabled as illustrated at block 232, and the job executes at block 237.

In a variation of the present embodiment, the user's permission to process is reevaluated dynamically as the user selects differing production job options before and/or after disabling of the processing option as illustrated by flow loops 233 and 234. In another variation, an administrator actively specifies threshold 202-1 at block 228. In a further variation, at optional block 235 the administrator can specify different thresholds, for example 202-1 through 202-N, where N is the number of allowed users, on a user-by-user basis (allowing some users to process more time consuming jobs than other users). In another variation, differing thresholds 202-1 through 202-N can be specified at block 235 for different periods of the day, week, or month. For example, the threshold can be set higher for nights and weekends and lower near the end of a month, when small-job usage may be more frequent. In another variation, both the user and the time period can be used in combination to specify differing thresholds 202-1 through 202-N at block 235, for example to reduce thresholds at month end for all except the accounting department. In another variation, if the user is excluded at block 230 from processing to production device 201, an optional webbased link 206 to an alternative production device, for example production device 203, as illustrated in FIG. 2, is provided as illustrated at block 236.

As an example, a 300 page job would not normally be allowed during the middle of a workday, and so would not have the option to process during those hours. Processing would be a disabled option for such a job, and would result in a no-process message for a three page job with 100 copies of each page or for a single copy of a 300 page document. In one variation, the same 300 page job can be permitted in the evening or during a weekend after normal working hours, when threshold 202-1, . . . , 202-N can be for example 1,000 pages or even a substantially limitless number of pages.

A further approach to relieving competition for shared production devices provides a system and method for interrupting the processing of multiple copies of a user's job with other jobs. The web-based imaging device interface provides a setting that indicates whether subsequent copies of a job can be interrupted. A web-based status display informs the user if user's job is temporarily deferred for a second user's job. The deferred job can either be stored on the production device hard disk 210 (see FIG. 2A) or accessed through personal imaging repository 30. When processing of the deferred job resumes, subsequent output copies can be stored in the original output bin. This allows a user to process multiple output copies without dominating the production device.

Figure 3:
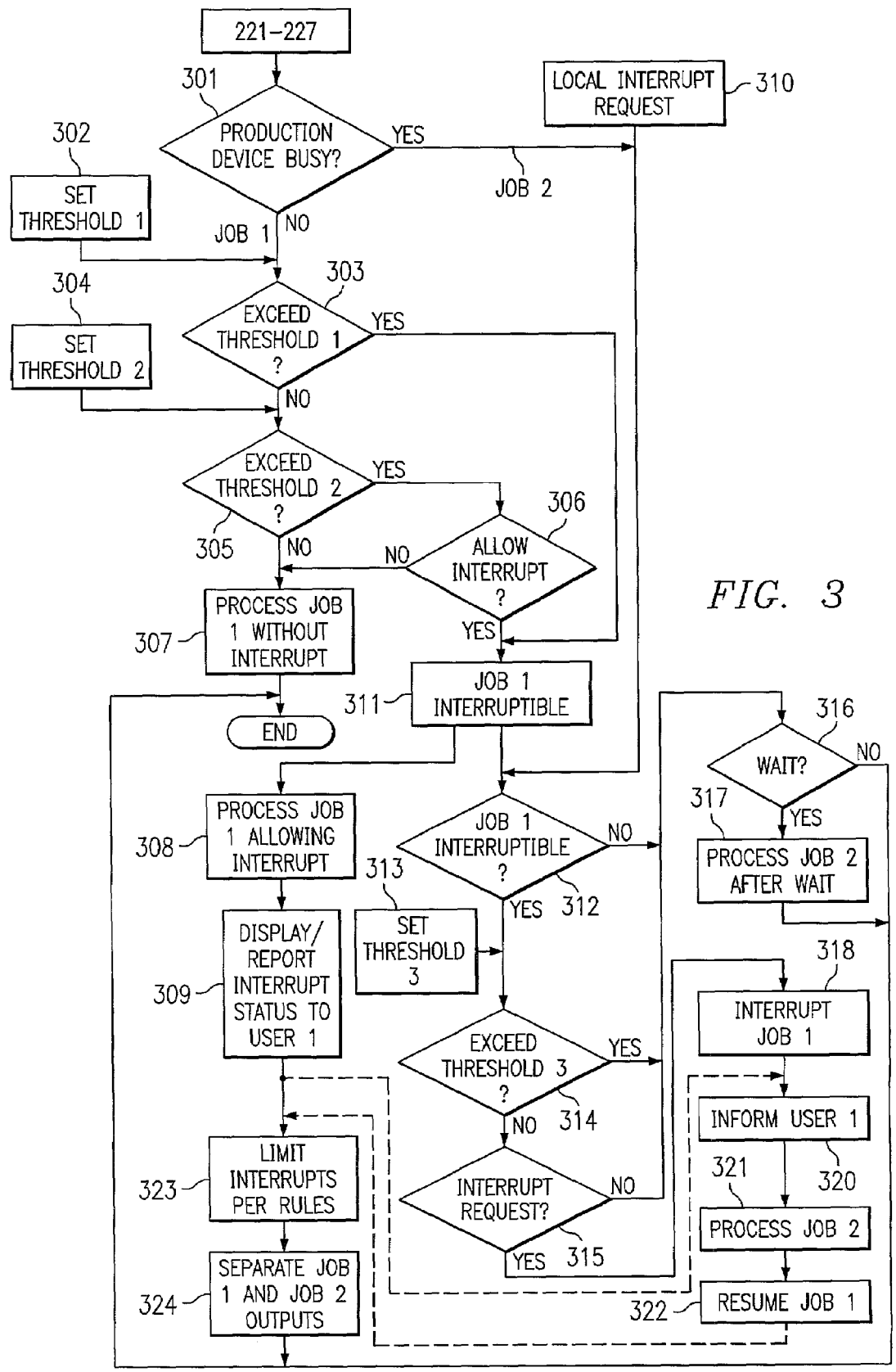
FIG. 3 is a flow diagram depicting operation of a web-based system for interrupting the processing of multiple copies of a user's job, in accordance with embodiments of the present invention.

FIG. 3 is a flow diagram depicting the operation of a web-based system for gracefully interrupting the processing of multiple copies of a user's job, in accordance with embodiments of the present invention. As indicated in FIG. 3, a first user having a job 1 browses to the web service representing a production device, for example destination service 34 representing production device 201 as illustrated in FIG. 2A, and performs the operations depicted in block 221 through block 227 of FIG. 2B. Following analysis at block 227 in FIG. 2B of the number of pages and estimated processing time and resources for Job 1, first user at block 301 is informed whether production device 201 is busy or available (i.e., not busy). If not busy, then in some embodiments operation proceeds to block 303, where it is determined whether or not the resources (e.g., number of pages, estimated processing time, number and type of finishing options, and the like) required to process Job 1 exceed a first threshold (Threshold 1) previously set at block 302. If so, then Job 1 becomes interruptible by default, as depicted at block 311.

If the required time and resources for Job 1 do not exceed Threshold 1, then in some embodiments operation proceeds to block 305, where it is determined whether or not the required time and resources of Job 1 exceed a second threshold (Threshold 2) previously set at block 304. If the time and resources for Job 1 do not exceed Threshold 2, then Job 1 is processed without interruption or delay as illustrated at block 307, since it was established at block 301 that production device 201 is not busy. If the required time and resources for Job 1 exceed Threshold 2 but do not exceed Threshold 1 (Threshold 2 generally being smaller than Threshold 1), then first user is presented with an option at block 306 whether or not to allow interruption of Job 1. If first user chooses not to allow interruption, then Job 1 processes without interruption or delay at block 307. If first user chooses to allow interruption of Job 1, then Job 1 becomes interruptible, as illustrated at block 311. Operation of Job 1 then proceeds without further delay to block 308, where Job 1 processing allowing interrupts begins at production device 201. In some embodiments, destination service 34 displays at first user's browser 16 a report of processing status of Job 1 including interrupt status, as illustrated at block 309. In some embodiments, if desired, the cycle could be arranged such that Job 1 is unconditionally interruptible or is interruptible if particular criteria are met.

Although FIG. 3 depicts three distinct ranges of estimated time and resources of Job 1 relative to Threshold 1 and Threshold 2, other variations of the embodiments can offer differing behavior. For example, for all values of estimated time and resources, Job 1 can be unconditionally interruptible or non-interruptible, or conditionally interruptible dependent on the choice of user 1, as depicted at block 306. These three ranges provide for allowing interruption at the option of first user only if Job 1 is sufficiently large (exceeding Threshold 2). However, if Job 1 also exceeds Threshold 1, then by default first user must allow interruptions, insuring that first user cannot monopolize production device 201 with a very large processing job. In some variations, if desired, exceptions can be made to prevent interruption of "special users," (for example the 'boss') and/or when certain parameters can be set. Alternatively, there may be only two ranges, unconditionally interruptible and non-interruptible respectively relative to a single threshold; or any two ranges, either of which can be interruptible, non-interruptible, or conditionally interruptible. Thresholds can be set arbitrarily or can be based on estimated or experienced processing results. In some embodiments, thresholds can vary depending on hours of the day or days of the week or month. Thresholds can be set differently for different users, thereby allowing some users higher priority than other users to interrupt a currently processing job. In some embodiments, thresholds such as Thresholds 1-3 can be determined statistically or adaptively.

To illustrate interruptible processing in an embodiment of the present invention, a second user having a processing Job 2 browses to the web service representing a production device, for example destination service 34 representing production device 201 as illustrated in FIG. 2A, and performs the operations depicted in block 221 through block 227 of FIG. 2B. Following analysis at block 227 of the number of pages and estimated processing time and resources of Job 2, second user at block 301 is informed that production device 201 is busy (currently processing Job 1). Alternatively, while Job 1 is processing, a second user can walk up to production device 201 and locally request a processing Job 2 as depicted at block 310, for example a convenience quick one-page copy job. Although for simplicity only two processing jobs are described herein, multiple processing jobs can compete for the same processing time and resources within the scope defined by embodiments of the present invention.

Illustratively, if second user finds Job 1 interruptible at block 312 and if the page count and other resources for Job 2 do not exceed at block 314 a Threshold 3 previously set at block 313, then second user is allowed to select an "interrupt request" button at block 315, whereupon interruption of current Job 1 begins at block 318. When production device 201 began processing Job 1 at block 308, first user at block 309 viewed a display at first user's browser 16 reporting the status of Job 1, for example, if page 1 of 100 and/or copy 1 of 100 is currently processing. This is done in a web based fashion. When interruption of current Job 1 begins at block 318, the status display of production device 201 is updated at block 320 to indicate the status of interrupted Job 1, for example "job deferred; this production device is being used." In some implementations the display can include a graphic that, for example, looks like an employee standing in front of the production device making a copy. In this way, first user is informed that his/her job is on hold, interrupted but not canceled. Second user proceeds to process Job 2 at block 321. After second user has completed making the requested photocopies, for example, first user's Job 1 resumes processing at block 322 and the status display is updated accordingly.

During the course of processing interruptible Job 1, various rules can be invoked as illustrated at block 323 to control and limit the number and nature of interrupts. For simplicity only one level of interrupt has been described herein, for example, a second interrupt is not allowed to interrupt a first interrupt. However, more complex interrupt rules can be invoked within the context of embodiments of the present invention.

At block 324 the separation of outputs of Job 1 and Job 2 is depicted. If second user has walked up to production device 201 as a local copier, then second user can hand carry Job 2 output, and Job 1 output is routed into a bin. If Job 1 and Job 2 are both web-based processing jobs, then their outputs can be separated, for example by offsetting from one another, by routing into different output bins, or by using separator sheets (ideally with a different color from the output). A variation of the embodiments limits interruption to copy boundaries, for example inserting a delay at block 318 until the current copy of Job 1 output clears before interrupting with Job 2. This provides a relatively clean implementation, which facilitates separation of the outputs of Jobs 1 and 2.

Returning to blocks 312-315 of FIG. 3, illustratively, if second user finds Job 1 non-interruptible at block 312 or if the page count and other resources for Job 2 exceed Threshold 3 at block 314 or if second user declines to select the "interrupt request" button at block 315, then second user can select an "I'll wait" button at block 316. If second user chooses to wait, then Job 2 waits for completion of current Job 1 and processes directly after Job 1, as illustrated at block 317. If second user declines to wait at block 316, then further consideration of processing of Job 2 by production device 201 is terminated.

Another approach to relieving competition for a production device provides a link that allows a user to make a reservation for processing a job, as an alternative to dominating a production device during normal daytime working hours. A user collects desired image information in user's personal imaging repository, browses to a destination service representing a production device (e.g., printer), configures desired options, and activates the destination service on a reservation basis, supplying time when processing is to begin. Resources necessary to complete the job are reserved, such that other processing is not allowed to consume these resources. In the case of a printer, for example, toner low is reported as if the reserved resources had already been consumed. Also in the case of a printer, the job would be retained, for example, on hard disk 210 of production device 201 as illustrated in FIG. 2A.

Figure 4:
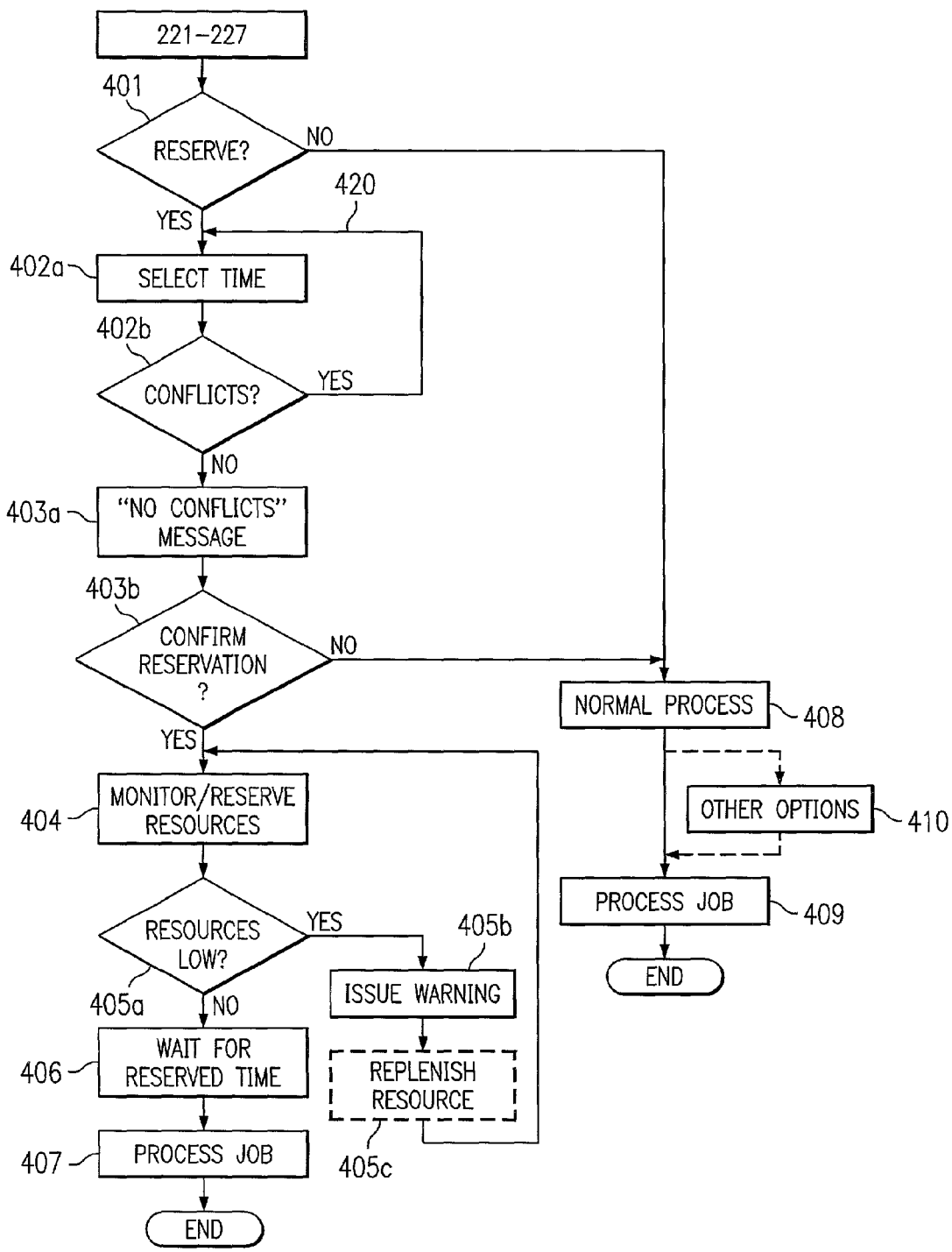
FIG. 4 is a flow diagram depicting the operation of a web-based system providing the ability to make a reservation for deferred processing of a user's job, in accordance with embodiments of the present invention.

FIG. 4 is a flow diagram depicting the operation of a web-based system providing the ability to make a reservation for deferred processing of a user's job, in accordance with embodiments of the present invention. As indicated in FIG. 4, a user having a processing job browses to the web service representing a production device, for example destination service 34 representing production device 201 as illustrated in FIG. 2A, and performs the operations depicted in block 221 through block 227 of FIG. 2B. Following analysis in some implementations at block 227 of the number of pages and estimated processing time and resources for the job, user at block 401 is provided an option of making a reservation for deferred processing of the job, for example on production device 201 represented by destination service 34. If the user selects the reservation option, then the user requests a job start time at block 402a.

If a conflict exists for the requested start time (e.g., production device 201 already reserved, start time administratively "blacked out" to reservations or otherwise not available for the requested start time), then in some implementations operation returns the user from block 402b, as illustrated by flow loop 420, back to block 402a, where user is prompted to request a different start time. When the user has requested a start time that provides adequate processing time for estimated completion of the user's job without conflicts, then a message communicating this fact is displayed to the user as illustrated at block 403a, and the user typically has the opportunity to confirm or decline the reservation at block 403b. If the user declines the reservation, operation proceeds through a normal processing path to block 408, in the same fashion as if the user had not selected the reservation option at block 401. In some implementations other options can be provided to the user, as illustrated at block 410, and the job is generally either processed as illustrated at block 409 or the dialogue between the user and destination service 34 is eventually terminated.

In some implementations, destination service 34 analyzes at block 227 the estimated processing time and resources for the user's reserved job. Destination service 34, by virtue of web based imaging, knows how many pages are required and it knows the settings that the user has chosen, for example the number of copies, duplex, and the like. Destination service 34 knows the nature and complexity of the imaging information, e.g., composition, retrieved by destination service 34 at block 224 of FIG. 2B. This enables destination service 34 to estimate at block 227 the required resources to process the user's job, for example paper and toner for a print job. If the user confirms to process on a deferred reservation basis at block 403b, then user's job is retained, for example on hard disk 210 (see FIG. 2A) and in some implementations the resources in addition to the time for processing the user's deferred job are also reserved, as illustrated at block 404. This is advantageous, because the user is allowed to submit a job for example during the day to be processed in the evening, and to have some basic level of assurance that the job will have adequate resources for completion.

In some implementations, when resources are reserved at block 404, destination service 34 periodically or continuously monitors the status of these resources using embedded sensors 209 (see FIG. 2A). This monitoring proceeds from the initial reservation of the resources at block 404 through the waiting period represented at block 406 until the eventual deferred processing of the job, as illustrated at block 407. In some implementations the reserved resources are reported as if they are already consumed. For example, if a user places a reservation that would use 10% of the toner and 30% of the paper that is available on a particular printer, then the reported status of these resources would be reduced by these quantities relative to their actual status. If a second user were to process additional jobs during the day that would start to cut into the portion of the toner and paper that had been reserved, destination service 34 in response to sensors 209 would signal a "resource low" at block 405a, and the second user would receive warning messages at block 405b that would, for example, look as if the paper were already depleted. Alternatively, at block 405b destination service 34 can issue warnings to users of production device 201 that they are violating a reservation. In some implementations, as illustrated at block 405c, replenishing the depleted resource can remove the "resource low" status and return destination service 34 to the previous monitoring state at block 404.

Broadly stated, the present invention is directed to an improved system and method for printing from a web application. The system and method provide printing from a web application that is independent of the configuration of the operating system. In addition, since the print destination server can return with specific print content that relates to a selected device, the present invention allows a preview of the print job in the context of the devices and/or services offered by the print destination server.

The system and method provide printing from a web application that is independent of the configuration of the operating system. In addition, since the print destination server can return with specific print content that relates to a selected device, the present invention allows a preview of the print job in the context of the devices and/or services offered by the print destination server.

Figure 5A:
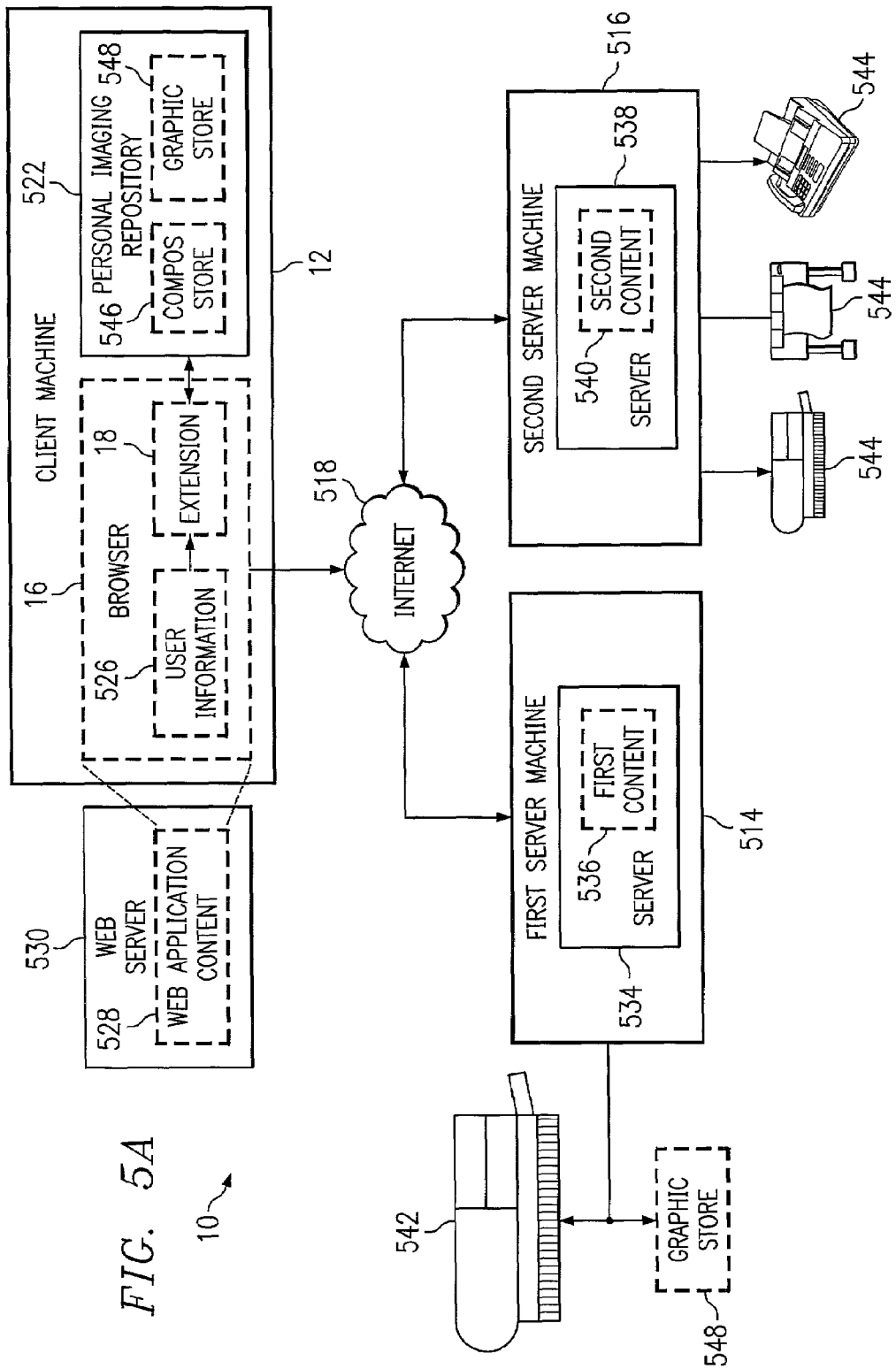
FIG. 5A is a schematic diagram depicting a client-server network system in accordance with embodiments of the present invention.

FIG. 5A is a schematic diagram depicting client-server network system 10 in accordance with embodiments of the present invention. Client machine 12 is connected to first server machine 514 and second server machine 516 via Internet 518. Client machine 12 includes client program (browser) 16 and preferably personal imaging repository 522. Browser 16 further includes extension component (imaging extension) 18 that makes use of user information 526 in order to provide an interface between content executing in browser 16 and personal imaging repository 522. More specifically, user information 526 is used for associating accesses through extension component 18 with the appropriate user's personal imaging repository. It should be noted that the user profile can associate different users or groups with personal imaging repository 522. For example, the user profile can associate a single user with a particular personal imaging repository, but, at the same time, this user can also have multiple user profiles, resulting in multiple personal imaging repositories associated with a single user. Similarly, the user profile can associate a group having multiple users with a particular personal imaging repository. A personal imaging repository, in this scenario, can be used by a group having a common association, such as a group project. As described, the user profile can be defined with great discretion and flexibility, and the above implementations are contemplated and within the scope of the present invention.

Although the preceding description defines the user profile broadly, it should be understood that in the present embodiment each user has one personal imaging repository. A personal imaging repository will not typically be associated with groups—it will typically be associated only with individuals, but could optionally allow several individuals to use the same repository. This personal imaging repository is defined by all the information and services that are relevant to performing imaging operations for the particular user. The "root" of a user's personal imaging repository is one or more user profiles, which are associated with the user through one or more sets of user information. The present invention is directed to implementing the concept of allowing a user's information to follow him/her around, i.e., be accessible from a variety of different locations, both inside a firewall and outside of the firewall, as well as from a variety of different machines.

Imaging extension 18 is configured to respond to the execution of generic access instructions from web application content 528 by generating/mapping these generic instructions to corresponding imaging client-specific commands of imaging client 16. However, this will happen only if user information 526 (containing references to the user's profiles) is available to imaging extension 18, to access the user's personal imaging repository 522.

Imaging extension 18 can be regarded and implemented as an application programming interface (API). The API used for imaging extension 18 is preferably structured in accordance with a system wide standard. The generic access instructions for example from web application content 528, when executed, can cause imaging extension API calls to be issued to the API in order to access the user's personal imaging repository 522 via imaging client-specific instructions. It will be recognized by those of ordinary skill in the art that there are other ways (both hardware and software) to implement this same functionality. Embodiments of the present invention are not limited to any one way. In essence, imaging extension 18 provides means for accessing user information 526 and for providing an opaque interface between web application content 528 executing in browser 16 and personal imaging repository 522 and other functionalities of imaging client 16. An example implementation of the imaging extension will be discussed in more detail below.

In operation, browser 16 initially accesses a web site and using appropriate request commands (HTTP for the current generation of browsers), downloads web application content 528 therefrom, which includes a set of executable instructions intended to be executed in browser16 to provide browser 16 with predetermined functionality. These executable instructions comprise generic access instructions (see definition above), which are system wide instructions expressed in some language (i.e., JAVA™), that call the resources of an imaging extension API to access the user's personal imaging repository 522 to perform web imaging operations. Such generic access instructions can be, by way of example but not by way of limitation, JAVA™, JavaScript™, and C-sharp instructions. A system wide standard preferably manifested as an API or set of APIs typically specifies "generic access instructions," "generic access requests," and "target graphics."

A variety of functionality can be provided by web application content 528 including, for example, executable instructions for imaging client 16 to display target graphics, i.e., show available graphics on the accessed web site. Another web application content can include executable instructions for displaying a print button, and if the print button is clicked, causing imaging client 16 to generate a print job that describes a graphic in the personal imaging repository 522 of the user and to transmit the print job, for example, to printer 542. A web application content can also provide a preview of the target graphic. Accordingly, web application content 528 refers to a set of executable instructions that are downloaded into browser 16 to perform a service requested by the user.

Browser 16 executes web application content 528, whether it is HTML interpreted and/or executed by browser 16 into marks displayed on a user's display, or JAVA™ and JavaScript™ or some other appropriate language. As previously noted, web application content 528 contains executable instructions that use the API provided by imaging extension 18 to indirectly access the user's personal imaging repository 522. For example, the executable instructions of the web application content can obtain an opaque access to the information from the user's profile (in order to specify the user's personal imaging repository) by interacting with a user profile store service (not shown).

In the discussion herein, the term "opaque reference" is used. An "opaque reference" is a reference that does not expose information about an underlying resource. The possessor of an opaque reference is unable to determine anything about the resource from the opaque reference or to modify the opaque reference so as to alter which resource is being referenced. (In contrast, if a URL is provided, for example, the Worldwide Web address of hp.com, it would be fairly straightforward for the web application content to modify the URL to refer to a different resource, for example, the Worldwide Web address of other.com)

The executable instructions of web application content 528 perform this access to obtain an opaque reference to the user's composition store 546 and graphic store 548. The web application content can further use the API provided by imaging extension 18 to add a new graphic to graphic store 548 via opaque reference.

Imaging extension 18 is configured to prevent web application content 528 (i.e., the executable instructions from web service 530), from directly accessing arbitrary services and the user's personal imaging repository 522. In essence, web application content 528 uses imaging extension 18 as a gateway to access everything in the user's personal imaging repository 522, including the information in the user profile.

This restricted access imposed on web application content 528 can be implemented using a variety of methods. The designer can implement the API for imaging extension 18 such that the API only accepts references from web application content 528 that were previously provided thereto by imaging extension 18. In essence, web application content 528 is then unable to supply references arbitrarily when calling the API provided by imaging extension 18. Web application content 528 running on imaging client 16, in order to communicate with imaging client resources and with user's personal imaging repository 522, must first obtain opaque references using the API of imaging extension 18. For example, if web application content 528 wants to access graphic store 548, web application content 528 is required to call a method (provided by the API of the imaging extension 18) that provides an opaque reference to graphic store 548. This reference can then be used in subsequent calls by web application content 528 to the API of imaging extension 18.

One approach to accomplishing this restriction is to create a session. For example, an imaging extension API for a particular operation might comprise:

CreateParticularOperationSession(): returns SessionID
PerformOperation(Parameter, SessionID id): returns Boolean (which indicate a result)
DeleteParticularOperationSession (SessionID)

Accordingly, web application content 528 is required to call the imaging extension API to first create a session by calling CreateParticularOperationSession, which returns a SessionID. This SessionID is subsequently used to refer to the particular session. Next, web application content 528 calls the PerformOperation in the imaging extension API with particular input and the SessionID. Web application content 528 can perform a variety of manipulations, but cannot directly access parameters and operations which are "associated" with the SessionID, because the association is accomplished in a way that is "opaque" to the client. The imaging extension API and that API alone knows how to use the SessionID to determine/map to imaging client parameters. Often, the SessionID will be a reference such as a pointer to a data structure containing information relevant to the session. This data structure can contain parameters and other pertinent information. When web application content 528 has completed its operation, web application content 528 calls DeleteParticularOperationSession in the imaging extension API with the SessionID as a parameter. This instructs the imaging extension API to free whatever resources (such as memory) are associated with the session. Note that if web application content 528 changes the SessionID, that will not allow web application content 528 to obtain restricted parameters, but will only confuse imaging extension 18 with the changed previously unseen SessionID.

The API provided by imaging extension 18 is typically implemented as a library of methods that provide controlled access to an API provided by the network services participating in user's personal imaging repository 522. This API is implemented to invoke the API provided by the user profile store, composition store 546, and graphic store 548. The API provided by imaging extension 18 is generally not accessed through remote invocation technology, although remote invocation technology can be implemented to access the APIs provided by the network services participating in the user's personal imaging repository 522. The API provided by imaging extension 18 is not an exact replication of APIs provided by the user profile store, composition store, and graphic store, since this API provides controlled access to those network services through (among other techniques) opaque references.

From the above description, it can be seen that web application content 528 is prevented from using the API provided by imaging extension 18 to access arbitrary services. The key to this restriction is that web application content 528 cannot supply the addresses for these arbitrary services. Web application content 528 can only refer to services through opaque references provided by the imaging extension API (not exposing the actual reference/URL to web application content 528). For example, web application content 528 can use the API to obtain a list of opaque references to available compositions. This list of opaque references instead would map to the real references/URLs in imaging extension 18, alone. Thus, in subsequently referring to these compositions, web application content 528 cannot supply a URL (which might be one of its own creation), because that created URL cannot map within imaging extension 18 to real resources. Instead, web application content 528 is required to use only references provided to it by the API, which make sense only in the context of the current session with that API. This restriction can be relaxed in circumstances where web application content 528 provides references to resources available from the same network service in which web application content 528 originated. This is permitted, because web application content 528 already has a measure of access to the web service from which it originated (either when originally generated or subsequently), thus not acquiring any special access not already available to web application content 528.

Browser 16 uses web application content 528 that is provided by web server 530. When the user selects "print" in the web application content, web application content 528 among other things directs browser 16 to the print destination. Although one client machine 12 and two server machines 514, 516 are shown as examples, a broader implementation can involve multiple server machines to which client machine 12 has access and can communicate. For better readability, a single client machine, server, production device, e.g., printer, or application has been and will be referred to and shown herein. However, it should be understood by showing only one or by the use of "a" that what is meant is "one or more". For example, although a single printer has been and will be described and shown, this printer may actually be a plurality of printers forming a printing resource. In such a situation, it is understood that the present inventive concepts apply.

First server machine 514 includes first server 534. When browser 16 is directed to first server 534 addressed by a unique Uniform Resource Locator ("URL"), first content 536 is served by the first server to browser 16. Each content 536 is preconfigured with specific instructions depending on the type of service the server machine represents. Similarly, second server machine 516 includes a second server 538 with a second content 540. Generally, the contents 536, 540 are different, because the services and/or access to devices provided by the servers are different. In FIG. 5A, first server machine 514 is connected to single printing device 542, whereas second server machine 516 serves multiple printing devices 544. Consequently, first content 536 and second content 540 are different from one another, each including separate instructions to browser 16.

Although it is shown that the servers represent only printing devices in this example, the server can represent other services. For example, the server can be an auction web site, such as ebay.com, which makes an auction page for the user when a graphic file is printed to the web site, or a check writing service. In embodiments of the present invention, the user can "print" to any one of many services. As a result, the use of the word "print" is intended to have a broad definition, which can be applied to many available devices or services. Whatever the services and/or device the servers provide, the content can include the instructions needed for the configuration. It is advantageous that a personal imaging repository 522 be implemented according to the present invention, to store data that can be accessed by these servers.

In the present embodiment, personal imaging repository 522 includes composition store 546 for storing composition(s) of the imaging data that are serviced as a single unit and an graphic store 548, i.e., digital memory, for storing the imaging data. An imaging composition generally comprises links to the imaging data (also known as graphics), which can be located at another service or services. Accordingly, composition store 546 stores only the imaging compositions. Graphic store 548, on the other hand, is any imaging data store located on any computer that contains the graphics. More specifically, each web service can have its own graphic store 548 available to the public.

For example, at some earlier time a user can print an article from a web service site, resulting in an imaging composition being created and stored in the user's composition store 546. The imaging composition contains only the link to the graphic for this article stored for example on first web service site 514. Consequently, the graphic for the article is not in the graphic store 548 located on client machine 12. Rather, the graphic is stored in a graphic store 548 located on web service site 514. Users will have a graphic store 548 that belongs to their user identification, where they can store imaging data, which is graphic store 548 shown in client machine 12. As a result, the term "personal imaging repository" 522 is a conceptual term for an exchange infrastructure between the imaging data and the available web services on Internet 518. Similarly, the term "web" denotes millions of distinct servers that comprise the web. However, the web does not actually do anything itself. In embodiments of the present invention, the servers serving composition store 546 and graphic store 548 are physical implementations of the personal imaging repository as a concept.

It should be noted that personal imaging repository 522 can represent any type of data storage device. In fact, the data storage device of personal imaging repository 522 does not necessarily have to be located with client machine 12. Personal imaging repository 522 can be located, for example, on another machine or segmented and distributed among multiple machines, which client machine 12 can access through Internet 518. Although it is frequently advantageous to include personal imaging repository 522 with client machine 12, this can change as data rates become faster and the popularity of personal digital assistant ("PDA") devices increases. These alternative implementations are considered to be within the scope of the present invention.

Figure 5B:
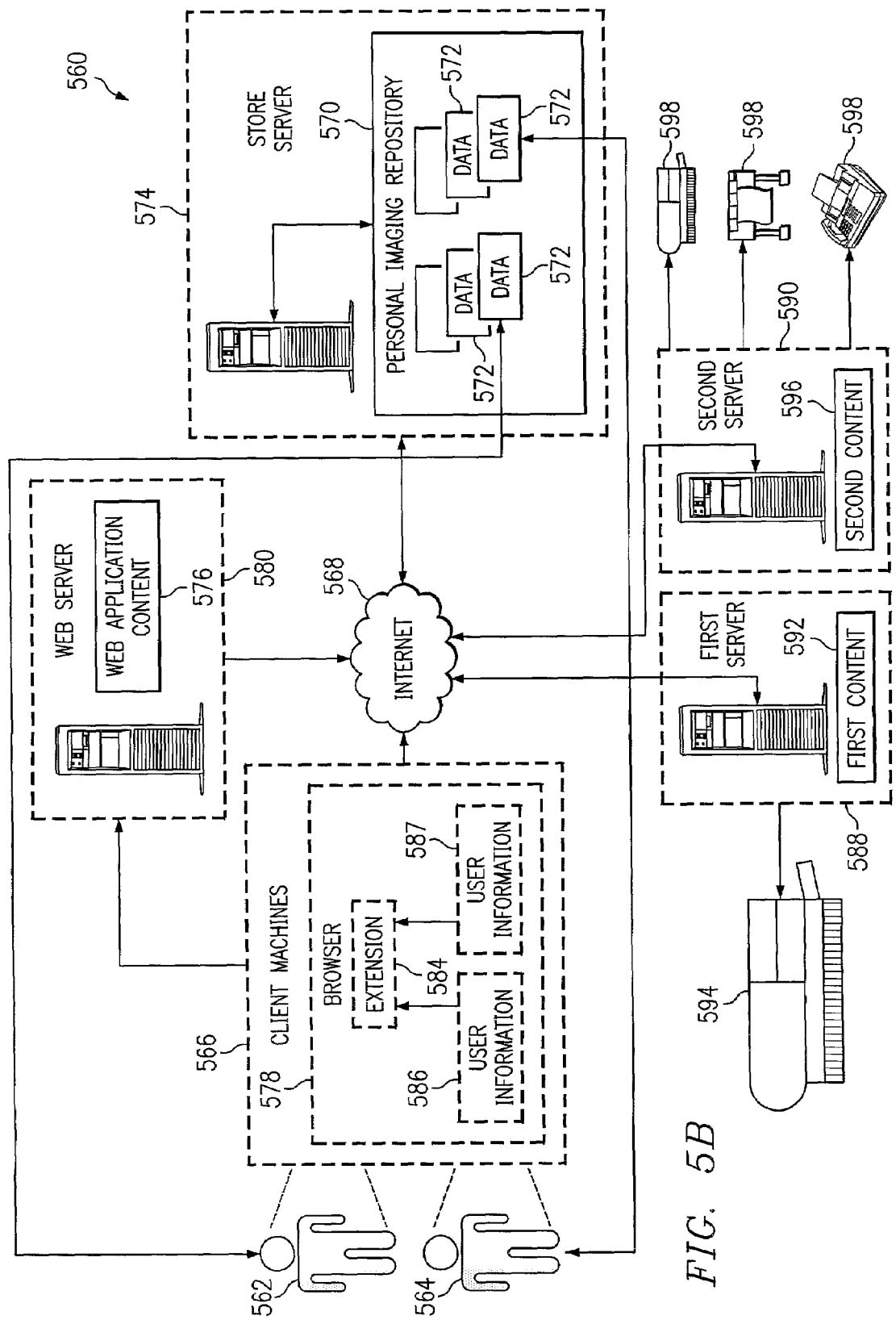
FIG. 5B is a schematic diagram depicting a variation of the client-server network system of FIG. 5A, which is tailored to faster data rates or limited client machine storage capacity.

FIG. 5B is a schematic diagram depicting a variation 560 of the client-server network system of FIG. 5A, which is tailored to faster data rates or limited client machine storage capacity. In this implementation, multiple users 562, 564 utilize the same client machines 566 through Internet 568. In this implementation, client machines 566 can include client computers that have less storage memory, such as a Personal Digital Assistant ("PDA") or a laptop. Because of limited storage memory, personal imaging repository 570 for storing user's data 572 is located on a separate computer 574, which can be a server computer or just a linked client machine 566. In this example, separate computer 574 is a server, which will be herein referred to as store server 574 to distinguish it from other servers for printing. Users 562, 564 are assigned distinct user profiles (not depicted explicitly in FIG. 5B) for accessing personal imaging repository 570 through store server 574. The user profile (or profiles) is part of the user's personal imaging repository. Users 562, 564 each have a distinct personal imaging repository, although only a single personal imaging repository 570 is depicted explicitly in FIG. 5B. Although not shown, personal imaging repository 570 can similarly be implemented with a composition store and a graphic store, where user's data 572 can be stored. User's data 572 is broadly interpreted to include one or more user profile store services, one or more composition store services and/or one or more graphic store services.

In operation, a first user 562 initially accesses system 560 with a login name and password. Once first user 562 has accessed system 560, the first user then also has access to the personal imaging repository 570 that is linked to this first user's login name. Similarly, if a second user 564 logs in with a login name and password, the second user has access to system 560, including the personal imaging repository 570 that belongs to this second user's login name. In this implementation, users can access system 560 and their personal imaging repository 570 from any computers that have a browser and Internet access. As a result of the flexibility of the Internet, it is possible for users to access system 560 and their personal imaging repository 570 using a standard PDA and/or wireless web phone.

Web application content 576 can be used by the users through a browser 578 that is located on client machine 566. Similar to the previous implementation, web application content 576 is provided through web server 580. Browser 578 also contains extension 584 for accessing user information 586, 587 that associate the different user profiles assigned to users 562, 564 with their respective personal imaging repositories. User information is different from a user profile. User information references one or more user profiles associated with a particular user. As shown, each user profile has its own user information. Alternatively, the user information can also contain information for two or more user profiles. These other variations are contemplated and are within the scope of the present invention.

Users can access a variety of servers on the Internet for the printing of the target data from web application content 576. In this example, there is first server 588 and second server 590. First server 588 provides first print content 592 representing single printing device 594, and second server 590 provides second print content 596 representing a plurality of printing devices 598.

Upon the user selecting PRINT or PRINT PREVIEW from web application content 576, web application content 576 first directs browser 578 to request a specific URL, which references a web page located on web server 580. Shown as an example in FIG. 5B, a user creates a document using web application content 576, and from web application content 576 the user can elect to PRINT the document (i.e., the target data).

In response to receiving the request for the web page specified by the aforementioned URL, web server 580 constructs an imaging data of the target data. An imaging data refers to the printed output of the target data, which does not necessarily look the same as the target data, depending on the behavior of web application content 576. This step of constructing an imaging data may not be necessary, and depends on the implementation and configuration of the print destination. For example, if sending a graphic file to the earlier example of an auction site for making an auction page with the graphic file, an imaging data might not have to be generated. Instead, print destination server 588, 590 can accept the target data without further modification for compatibility. However, since it is hard to foresee what type of graphic files the web site will accept, the exemplary method is implemented with the intermediate step of constructing imaging data to guarantee uniformity and compatibility. Formats for the imaging data include JPEG, Graphics Interchange Format ("GIF"), Portable Network Graphics Format, Tagged Image File Format ("TIFF"), PDF and Microsoft Windows bitmap format ("BMP").

After web server 580 constructs the imaging data for the target data, web application content 576 transfers the imaging data to personal imaging repository 570. It is then determined whether personal imaging repository 570 is located on client machine 566 or on store server 574. If personal imaging repository 570 is located on the client machine 566, the imaging data is saved to personal imaging repository 570 without further connection. If, however, personal image repository 570 is located on store server 574, client machine 566 will connect to store server 574. It is then determined whether the connection is successful before a timeout, and client machine 566 will keep trying to connect to store server 574 until a timeout or successful connection occurs. Once the connection with store server 574 is successful, client machine 566 transfers the imaging data to store server 574 for storage in personal imaging repository 570.

After the imaging data is stored in personal imaging repository 570, web application content 576 directs browser 578 to the server indicated by print destination 594, which will be referred to as print destination server 588. It is next determined whether print destination server 588 is available for printing. An error message is sent to browser 578 if the print destination server 588 is not available. If, on the other hand, print destination server 588 is available, it will respond to browser 578 by returning a print content 592, which will be displayed on browser 578 for user configuration. Print content 592 is generally a web page that is designed according to the services that this print destination provides. Furthermore, there are a number of ways to implement print content 592, depending on the services available. For example, print content 592 can be configured to display a list of imaging data stored in personal imaging repository 570. In this scenario, print content 592 accesses personal imaging repository 570 to obtain the list for display to the user. The above described variations are contemplated and should be considered within the scope of the present invention.

As an example, if print destination server 588, 590 represents multiple printing devices, a page of the print application content may contain all the printing devices 594, 598 that are available for user selection. From this page of the print content the user selects a printing device, and another page is returned to the user with the imaging data and the configurations that are available for this particular printing device. Through the print content, the user is able to print or print preview the imaging data according to the configurations of printing devices 598. In the auction site example, users can preview the auction page that they configured before posting onto the auction list. As shown, the print content can be returned with multiple pages depending on the need of the services provided by the print destination server.

Once the user-selected configuration is finalized, the user can then select to PRINT or PRINT PREVIEW from print content 592. Print content 592 accesses the imaging data from personal imaging repository 570, and transfers the imaging data with the specified user configuration to print destination server 588, through which the imaging data is printed or displayed according to the specified configurations including selected printing device 594. At the end, the print content can return a status page to indicate successful output at the printing device.

Personal imaging repository 570 is an example of the notion of "identity." The user has a network "identity" through which he/she is represented. Personal imaging repository 570 contains information associated with the user's identity. The foregoing description addresses a computing environment in which imaging extension 584 is used to make user information available to web content 592, 596 downloaded into browser 578. Imaging extension 584 makes information associated with the user's identity available. The primary purpose of imaging extension 584 is to provide access to information that is identified by user specific information 586, 587. In essence, this is a client-side approach to identifying user information.

Although it is possible to extend browsers on Windows operating systems, it becomes harder to do this for newer devices like PDAs. Consequently, it is desirable to support the notion of identity without requiring the browser to be extended. Alternatively, a server-side approach to identifying user information is possible. This can be accomplished by moving the logic normally present in web content 592, 596 running within browser 578 into web server 588, 590. Rather than web content 592, 596 accessing services specific to the user, web server 588, 590 directly accesses services specific to the user. In other words, the identity technology is server side instead of client side.

When using server side identity technology, because browser 578 no longer provides information regarding a user's identity, an "authentication website" can be used to provide such information. In such an arrangement, web content 592, 596 redirects browser 578 to the authentication website, which determines the identity of the user and then redirects browser 578 back to the web content 592, 596 with the user identity, including the location of the user's profile. For this purpose, it is assumed that all web imaging destinations have information regarding the authentication server. Once the user's identity is determined (i.e., the location of the user's profile is known), then web imaging destination can interact directly with services specific to the user, without intervention of imaging extension 584.

The web-based imaging techniques described herein are among many alternative web-based imaging techniques anticipated in accordance with the present invention. In a particular technique, the imaging information (e.g., print data) is accessed by content using an imaging extension, which is integrated into the browser. In a variation, the web server (e.g., destination server) can access the imaging information from the user's identity directly without the aid of its web content or the imaging extension. In another variation, the imaging information can be uploaded directly to the web server using the file upload mechanisms integrated into many web browsers.

A user accesses a web-based destination service (e.g., representing a printer), which retrieves user's imaging data and configures available production options. The user defines a processing job for the imaging data, selecting desired production options, after which the destination service estimates the time duration required to process the user's job using the selected options on the production device represented by the destination service.

Described herein are three distinct approaches for advantageously relieving competition for shared production devices in a web-based imaging environment. In the approach described in connection with FIG. 2B, users with time consuming large jobs are prevented from using certain production devices depending on factors including the time of day and the identity of the user, thereby freeing these production devices for processing smaller jobs. In a second approach, described in connection with FIG. 3, processing of small jobs can gracefully interrupt the processing of larger jobs, enabling users with small jobs and users with large jobs to share a single production device without the risk that processing large jobs will prevent the processing of other jobs. In a third approach, described in connection with FIG. 4, a user can reserve processing time and resources for processing a job at a deferred time. This enables a user to schedule time consuming large jobs, for example, outside of normal working hours, leaving the production device available to process smaller jobs during the normal workday and still reserving adequate resources for the deferred processing of the larger job.

In one approach, if the estimated amount of time required is greater than a predetermined threshold, the option of processing is disabled. If not, the option to process is enabled. Typically, a message is displayed to the user indicating that the processing option is disabled. In a variation, the user's ability to process is reevaluated as the user selects differing options. In another variation, an administrator can specify the threshold. In another variation, the administrator can specify the threshold on a user-by-user basis (allowing some users to process more time consuming jobs than other users). In another variation, the size of job allowed to be processed can be specified based on time of day and/or day of week and/or month. In another variation, both the user and the time of day and/or day of week and/or month can be used to specify the size of job that can be processed. In another variation, if the user cannot process to this production device, a link to an alternative device is provided.

An alternative approach provides an option of interrupting the processing of multiple copies of a currently processing job with another processing job. In some embodiments, the destination service provides an option that indicates whether subsequent copies of a currently processing job can be interrupted. If so, a subsequent user can interrupt, and a status message to the first user indicates that the job is temporarily interrupted for another job. The interrupted job can either be stored on the printing device hard disk or accessed through the user's identity and is resumed intact after the interrupting job has processed. Subsequent output copies can be delivered into the original output tray, or can for example be delivered into a single output tray with copies of the two jobs offset from one another or separated using separator sheets. In this way the original user of the production device has a level of assurance that his/her job, although interrupted, is resumed and not canceled and that the processed output is intact. The interrupting user can either access the production device manually or through the destination service representing the production device. In some embodiments, if the currently processing job includes multiple output copies, then it is allowed to complete the current copy before being interrupted.

In some embodiments, the subsequent user is provided an option to process his/her job after processing of the currently processing job is complete. In some embodiments the currently processing job is interruptible conditional on its estimated required processing time relative to a previously determined threshold. Sufficiently large jobs may be unconditionally interruptible. In some embodiments a subsequent job is allowed to interrupt a currently processing job only if the estimated required processing time of the subsequent job is smaller relative to a previously determined threshold.

In a further approach the user is provided an option of reserving a deferred start time for deferred processing of user's processing job. If the user opts to reserve a deferred start time, then the user sets the deferred start time and user's job is stored, for example in a hard disk when the production device is a printer. In some implementations setting the deferred start time includes avoiding time periods when the production device is unavailable, for example due to a previous reservation.

In some implementations, resources to process the job are estimated and reserved and monitored until needed for deferred processing. Other jobs are not allowed to consume these resources. In the case of a printer, for example, toner low is reported as if the reserved toner had already been consumed. In some implementations, a warning message is displayed whenever a reserved resource is depleted to a quantity insufficient for the deferred processing, and can be removed if the reserved resource is subsequently replenished.

Embodiments of the three approaches described in connection with FIG. 2B, FIG. 3, and FIG. 4 respectively can be applied independently of one another or in combination with one another with respect to the above alternatives. The technical advantages of the approaches enable a user with a large job to process that job without fear that their job will prevent the jobs of others from processing. Users with large jobs and users with small jobs can both use a single production device. Processing can be selectively disabled according to the time of day, the user, and the size of the job, freeing certain production devices for use with smaller jobs.

A user can process multiple copies without dominating the production device. A user can configure and submit a large job during the day to process late at night and still have enough resources to complete. Known prior art systems and methods can schedule the processing of a job, but do not take into account an estimate of how much time or resources are required to process a job. It is currently possible to indicate through Windows 2000 when certain printers are available, but this is platform dependent. Although some copiers provide a job interrupt button, they do not support printing.

What is claimed is:

1. A method of relieving competition between processing jobs sharing a production device, said method comprising:
   accessing from a user's browser a destination service representing said production device;
   retrieving imaging information of said user by said destination service;
   selecting among production options provided by said destination service for determining a first processing job to process said imaging information using said production device;
   estimating, based on said imaging information and said selected production options for said first processing job, a processing time required to process said first processing job using said production device;
   providing said user an option of reserving a start time at which deferred processing of said first processing job using said production device is to occur;
   if said user opts to reserve the start time, setting a first deferred start time, storing said first processing job during a deferral period until said first deferred start time, and processing said first processing job using said production device at said first deferred start time;
   if processing of a second processing job is requested during a time period conflicting with processing of said first processing job based on the first deferred start time and the estimate processing time of the first processing job, providing an option of reserving a second deferred start time at which deferred processing of the second processing job is to occur, the second deferred start time avoiding conflict with the processing of said first processing job; and
   if the estimated processing time of the first processing job is greater than an established threshold, providing an alternate production device for processing of the first processing job,
   wherein if the estimated processing time of the first processing job is greater than the established threshold, enabling the user to select differing production options for said first processing job, and reevaluating, based on said imaging information and said differing production options, a reevaluated processing time required to process said first processing job.

2. The method of claim 1 wherein said processing job is stored in a medium selected from the group consisting of a hard disk and an image store associated with said user's identity.

3. The method of claim 1 wherein said setting said first deferred start time includes avoiding conflict with unavailable deferred start times of said production device.

4. The method of claim 1 further comprising estimating resources required to process said processing job using said production device with said selected production options.

5. The method of claim 4 further comprising reserving quantities of said resources required to process said processing job during said deferral period.

6. The method of claim 5 wherein said reserved resources required to process said first processing job are monitored during said deferral period.

7. The method of claim 6 wherein during said deferral period a warning message is displayed whenever any of said reserved resources is depleted to a quantity not greater than said reserved quantity of said reserved resource.

8. The method of claim 7 wherein during said deferral period said reserved resources are reported as if said reserved quantities of said reserved resources had already been consumed.

9. The method of claim 7 wherein during said deferral period said warning message is removed if said reserved resources are replenished above said reserved quantity.

10. The method of claim 1 further comprising interrupting an existing processing job having a first arrived at priority, that is currently using a production device, such that another processing job can use said production device, said another processing job having a second arrived at priority different from said first arrived at priority.

11. A method of relieving competition between processing jobs sharing a production device, said method comprising:
accessing from a user's browser a destination service representing said production device;
retrieving imaging information of said user by said destination service;
selecting among production options provided by said destination service for determining a first processing iob to process said imaging information using said production device;
estimating based on said imaging information and said selected production options for said first processing job, a processing time required to process said first processing job using said production device;
providing said user an option of reserving a start time at which deferred processing of said first processing job using said production device is to occur;
if said user opts to reserve the start time, setting a first deferred start time, storing said first processing job during a deferral period until said first deferred start time, and processing said first processing job using said production device at said first deferred start time;
if processing of a second processing job is requested during a time neflod conflicting with processing of said first processing job based on the first deferred start time and the estimated processing time of the first processing job, providing an option of reserving a second deferred start time at which deferred processing of the second processing job is to occur, the second deferred start time avoidina conflict with the processing of said first processing job; and
if the estimated processing time of the first processing job is greater than an established threshold, providing an alternate production device for processing of the first processing job,
wherein if the estimated processing time of the first processing job is greater than the established threshold, enabling the user to allow interruption of processing of said first processing job if processing of the second processing job is requested during processing of said first processing job.

12. The method of claim 11 wherein said first processing job is stored in a medium selected from the group consisting of a hard disk and an image store associated with said user's identity.

13. The method of claim 11 wherein said setting said first deferred start time includes avoiding conflict with unavailable deferred start times of said production device.

14. The method of claim 11 further comprising estimating resources required to process said first prccessing job using said production device with said selected production options.

15. The method of claim 11 further comprising interrupting an existing processing job having a first arrived at priority, that is currently using a production device, such that another processing job can use said production device, said another processing job having a second arrived at priority different from said first arrived at priority.

16. A destination service representing a production device, said destination service operable to:
download content into a browser;
retrieve first imaging information;
select under user interactive control via said content from among production ontions for processing said first imaging information using said production device;
estimate, based on said first imaging information and said selected production options, a processing time required to process said first imagine information using said production device;
provide an option of reserving a first deferred start time at which deferred processing of said first imaging information is to occur:
if the first deferred start time is reserved, implement deferred processing of said first imaging information using said production device at said first deferred start time;
if processing of second imaging information using said production device is requested and processing of said second imaging information conflicts with processing of said first imaging information based on the first deferred start time and the estimated processing time of the first imaging information, provide an option of reserving a second deferred start time at which deferred processing of said second imaging information is to occur, the second deferred start time avoiding conflict with the processing of said first imaging information;
if the estimated processing time of the first imaging information is greater than an established threshold, provide an alternate production device for processing of the first imaging information; and
if the estimated processing time of the first imaging information is greater than the established threshold, enable a user to select differing production options for processing said first imaging information, and reevaluate, based on said first imaging information and said differing production options, a reevaluated processing time required to process said first imaging information.

17. The destination service of claim 16 further operable to estimate resources required to process said first imaging information with said selected production options.

18. The destination service of claim 17 further operable to reserve until said deferred start time said required resources in quantities sufficient to process said first imaging information with said selected production options.

19. The destination service of claim 18 further operable to monitor until said deferred start time said required resources and to display a warning message whenever any of said reserved resources is depleted to a quantity not greater than said reserved quantity of said reserved resource.

20. A destination service representing a production device, said destination service operable to:
- download content into a browser;
- retrieve first imaging information;
- select, under user interactive control via said content, from among production options for processing said first imaging information using said production device;
- estimate, based on said first imaging information and said selected production options, a processing time required to process said first imaging information using said production device;
- provide an option of reserving a first deferred start time at which deferred processing of said first imaging information is to occur;
- if the first deferred start time is reserved, implement deferred processing of said first imaging information using said production device at said first deferred start time;
- if processing of second imaging information using said production device is requested and processing of said second imaging information conflicts with processing of said first imaging information based on the first deferred start time and the estimated processing time of the first imaging information, provide an option of reserving a second deferred start time at which deferred processing of said second imaging information is to occur, the second deferred start time avoiding conflict with the processing of said first imaging information;
- if the estimated processing time of the first imaging information is greater than an established threshold, provide an alternate production device for processing of the first imaging information; and
- if the estimated processing time of the first imaging information is greater than the established threshold, enable a user to allow interruption of processing of said first imaging information if processing of the second imaging information is requested during processing of said first imaging information.

21. The destination service of claim 20 further operable to estimate resources required to process said first imaging information with said selected production options.

* * * * *

UNITED STATES PATENT AND TRADEMARK OFFICE
CERTIFICATE OF CORRECTION

PATENT NO. : 7,305,449 B2
APPLICATION NO. : 10/001721
DATED : December 4, 2007
INVENTOR(S) : Shell S. Simpson et al.

It is certified that error appears in the above-identified patent and that said Letters Patent is hereby corrected as shown below:

In column 2, line 67, delete "innumber" and insert -- inNumber --, therefor.

In column 3, line 2, delete "BaseConversionAPI java" and insert -- BaseConversionAPI.java --, therefor.

In column 3, lines 6-7, delete "BaseConversionAPIjava" and insert -- BaseConversionAPI.java --, therefor.

In column 6, line 5, delete "niform" and insert -- (Uniform --, therefor.

In column 24, line 38, in Claim 1, delete "estimate" and insert -- estimating --, therefor.

In column 24, line 55, in Claim 2, after "said" insert -- first --.

In column 24, line 63, in Claim 4, after "said" insert -- first --.

In column 24, line 66, in Claim 5, after "said" insert -- first --.

In column 25, line 30, in Claim 11, delete "iob" and insert -- job --, therefor.

In column 25, line 32, in Claim 11, after "estimating" insert -- , --.

In column 25, line 46, in Claim 11, delete "neflod" and insert -- period --, therefor.

In column 25, line 52, in Claim 11, delete "avoidina" and insert -- avoiding --, therefor.

In column 26, line 5, in Claim 14, delete "prccessing" and insert -- processing --, therefor.

In column 26, line 19, in Claim 16, after "select" insert -- , --.

In column 26, line 19, in Claim 16, after "content" insert -- , --.

In column 26, line 20, in Claim 16, delete "ontions" and insert -- options --, therefor.

In column 26, line 24, in Claim 16, delete "imagine" and insert -- imaging --, therefor.

In column 26, line 29, in Claim 16, delete "occur:" and insert -- occur; --, therefor.

UNITED STATES PATENT AND TRADEMARK OFFICE
CERTIFICATE OF CORRECTION

PATENT NO. : 7,305,449 B2
APPLICATION NO. : 10/001721
DATED : December 4, 2007
INVENTOR(S) : Shell S. Simpson et al.

It is certified that error appears in the above-identified patent and that said Letters Patent is hereby corrected as shown below:

In column 27, line 16, in Claim 20, delete "proeessing" and insert -- processing --, therefor.

In column 27, line 19, in Claim 20, delete "proeessing" and insert -- processing --, therefor.

Signed and Sealed this

Fifteenth Day of July, 2008

JON W. DUDAS
*Director of the United States Patent and Trademark Office*